United States Patent [19]

Jansson

[11] 4,162,524
[45] Jul. 24, 1979

[54] DC-DC CONVERTER

[75] Inventor: Leonard E. Jansson, Banstead, England

[73] Assignee: U.S. Philips Corporation, New York, N.Y.

[21] Appl. No.: 788,799

[22] Filed: Apr. 19, 1977

[30] Foreign Application Priority Data

Apr. 21, 1976 [GB] United Kingdom ............... 16106/76

[51] Int. Cl.² .......................................... H02M 3/335
[52] U.S. Cl. ....................................... 363/56; 363/25; 363/97; 363/21
[58] Field of Search .................................... 363/18–21, 363/24, 25, 55, 56, 97, 134

[56] References Cited

U.S. PATENT DOCUMENTS

| 3,596,165 | 7/1971 | Andrews | 363/19 |
| 3,657,631 | 4/1972 | Martens et al. | 363/26 |
| 3,742,371 | 6/1973 | Seibt et al. | 363/18 |

Primary Examiner—William M. Shoop
Attorney, Agent, or Firm—Thomas A. Briody; William J. Streeter; Bernard Franzblau

[57] ABSTRACT

A DC-DC converter includes a switching transistor coupled to output terminals via an inductor and a rectifier. The converter also includes a circuit for sensing whether a current change in the main current path of the switching transistor reaches a given value subsequent to an initial current rise, if any, at the start of a conduction period. A control circuit is responsive to said sensing circuit to remove the drive to the switching transistor if said given value is reached.

12 Claims, 2 Drawing Figures

DC-DC CONVERTER

THIS INVENTION relates to a dc - dc converter comprising a switching transistor, a switching signal source having its output coupled to the control electrode of said transistor, and an inductance forming a series combination with the main current path of said transistor, said inductance being coupled to a pair of output terminals via a rectifier with a polarity such that, when a load is present across said output terminals, a dc supply is connected across said series combination with the correct polarity for the transistor, and the transistor is caused to conduct, the rectifier will be forward biased.

When the transistor in such a converter conducts, the current carried thereby comprises the load current (actual or reflected by means of a transformer) plus the magnetizing current of the inductance. This magnetizing current increases during each "on" period of the transistor and a circuit is normally present for returning the resulting energy which becomes stored in the inductance to the supply during each transistor "off" period.

Transistors can be destroyed very easily by overloading them, and it is therefore usual to provide such converters with a fast-acting current limit circuit to protect the transistor from the effects of excessive currents. Such a circuit may, for example, comprise a low-value resistor connected in series with the main current path of the transistor or coupled into it via a current transformer, together with a voltage level detector connected across the resistor. The level detector is designed to operate at a resistor voltage corresponding to the maximum permissible transistor current and causes the drive to the transistor to be removed as quickly as possible when such a voltage is reached so as to minimize any increase in the transistor current thereafter.

While such current limit circuits can be very effective at protecting the transistor from the effects of excessive load currents they have been found to be not so effective at protecting it from the effects of a saturation condition occurring in the inductance (which will normally be an iron or ferrite-cored transformer or choke). Such a saturation condition may arise, for example, due to too long an "on" time of the transistor allowing the magnetization current of the inductance to increase to an excessive value or, if the converter is of the push-pull type, to an imbalance between its two halves producing a "staircasing" effect in the magnetization. If the inductance should be driven into saturation the magnetizing current may increase so rapidly thereafter that the operation of the conventional current limit circuit will be too slow to save the transistor. If the conventional current limit circuit is not to interfere with the normal operation of the converter the transistor current level at which it operates must be at least equal to the sum of the maximum load current expected and the maximum magnetizing current. Because the maximum magnetizing current is typically 10% of the maximum load current it may be that, with a low load current, the magnetizing current will be able to increase to ten times the maximum value expected before the current limit circuit operates. When this value of magnetizing current is reached the inductance is likely to be well into saturation so that the magnetizing current will be increasing very rapidly indeed. Even if the operation of the actual current limit circuit should be effectively instantaneous under these conditions the effect, for example, of charge carriers stored in the base region of the transistor may result in the transistor taking a sufficiently long time to reach the "off" condition such that it is destroyed before it has achieved cut-off.

It is an object of the invention to provide a dc - dc converter which will be less susceptible to this effect.

The invention provides a dc - dc converter comprising a switching transistor, a switching signal source having its output coupled to the control electrode of said transistor and an inductance connected in series combination. The main current path of said transistor, which inductance is coupled to a pair of output terminals via a rectifier with a polarity such that, when a load is present across said output terminals, a dc supply is connected across said series combination with the correct polarity, and the transistor is made to conduct, the rectifier will be forward biassed. The converter further comprises a current change sensing circuit having its input coupled to the main current path of said switching transistor for sensing if the increase in the current in said main current path occurring during at least a given part of any conduction period of said transistor reaches a given value, which part does not include the start of the corresponding conduction period. The sensing circuit is substantially insensitive to the absolute value of said current and has its output coupled to the input of a current control circuit for controlling the switching transistor current so as to prevent the current in the main current path of said switching transistor from exceeding the transistor rating if said given value should be reached.

It has now been recognised that the change which occurs in the current in the main current path of the switching transistor in such a converter during each conduction period, and after the initial rise (if any) in said current at the start of that conduction period, (neglecting any switching transients) is a measure of the degree of saturation (if any) of the inductance and can be substantially independent of the load current. Thus a protection circuit which is responsive to this change can operate more quickly when the inductance saturates with a low value of load current than could a circuit the operation of which depends on the transistor current reaching a given absolute value which is greater than the sum of the maximum expected load current and the maximum magnetizing current.

An embodiment of the invention will be described, by way of example, with reference to the accompanying diagrammatic drawing, in which:-

Figure 1:
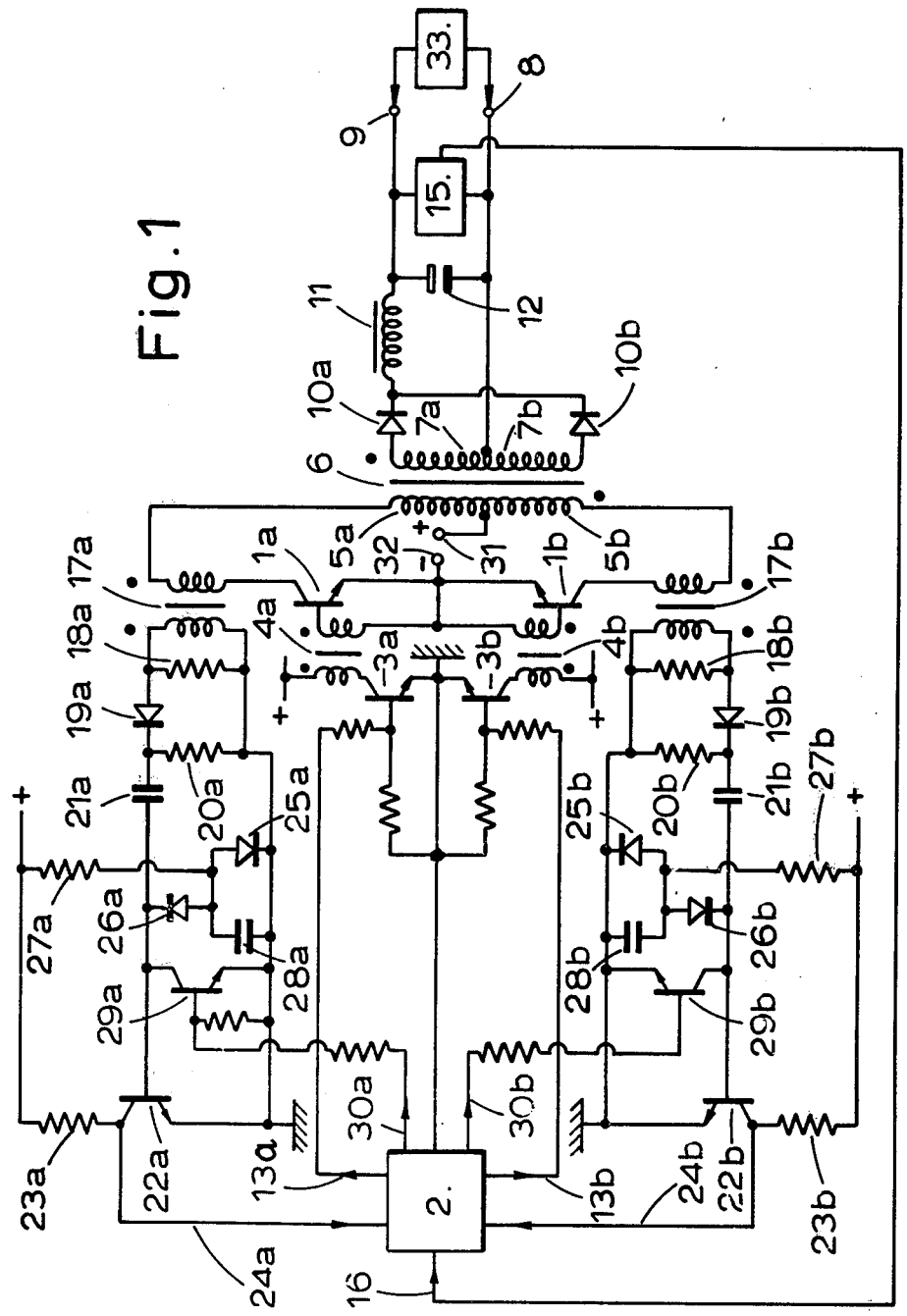
FIG. 1 is a circuit diagram of the embodiment.

In FIG. 1 a dc - dc converter of the push-pull type comprises a pair of switching transistors 1a, 1b the bases of which are driven in the conventional manner from output terminals 13a, 13b of a push-pull switching signal source 2 via driver transistors 3a and 3b respectively and drive transformers 4a and 4b respectively. The collector circuits of transistors 1a and 1b winding include halves 5a and 5b respectively of the primary of a centre-tapped output transformer 6 in series therewith, which transformer has a centre-tapped secondary winding 7a, 7b. The centre tap of this secondary winding feeds one output terminal 8. The other output terminal 9 is fed from the two ends of the secondary winding of transformer 6 via rectifiers 10a and 10b respectively, a choke 11, and a smoothing capacitor 12. A voltage sensor 15 senses the voltage across terminals 8, 9 in a conventional manner. The output of sensor 15 is fed to a control input 16 of source 2 to control the mark-to-space ratio of the output thereof in a conventional manner to stabilise the output voltage across terminals 8, 9 at a predetermined value.

The main current paths of the transistors 1a and 1b also include the primary windings of current transformers 17a and 17b respectively, the secondary windings of which have resistors 18a and 18b respectively connected across them. These secondary windings feed load resistances 20a and 20b respectively via rectifiers 19a and 19b respectively. Each combination of a current transformer 17 with its associated resistors 18 and 20 and rectifier 19 constitutes a current-to-voltage converter for producing a voltage proportional to the instantaneous current in the collector circuit of the corresponding switching transistor 1. These (positive) voltages are applied via capacitors 21a and 21b respectively to the bases of transistors 22a and 22b respectively. The collector loads 23a and 23b respectively of these transistors 22a and 22b are coupled to output inhibit control terminals 24a and 24b respectively of switching signal source 2.

The bases of transistors 22a and 22b are each prevented from attaining a negative potential by an arrangement of a pair of diodes, a resistor and a capacitor 25a, 26a, 27a, 28a and 25b, 26b, 27b, 28b respectively. The base-emitter paths of the transistors 22a and 22b are also shunted by the collector-emitter paths of transistors 29a and 29b respectively, the bases of which are fed from further outputs 30a and 30b respectively of switching signal source 2.

Figure 2:
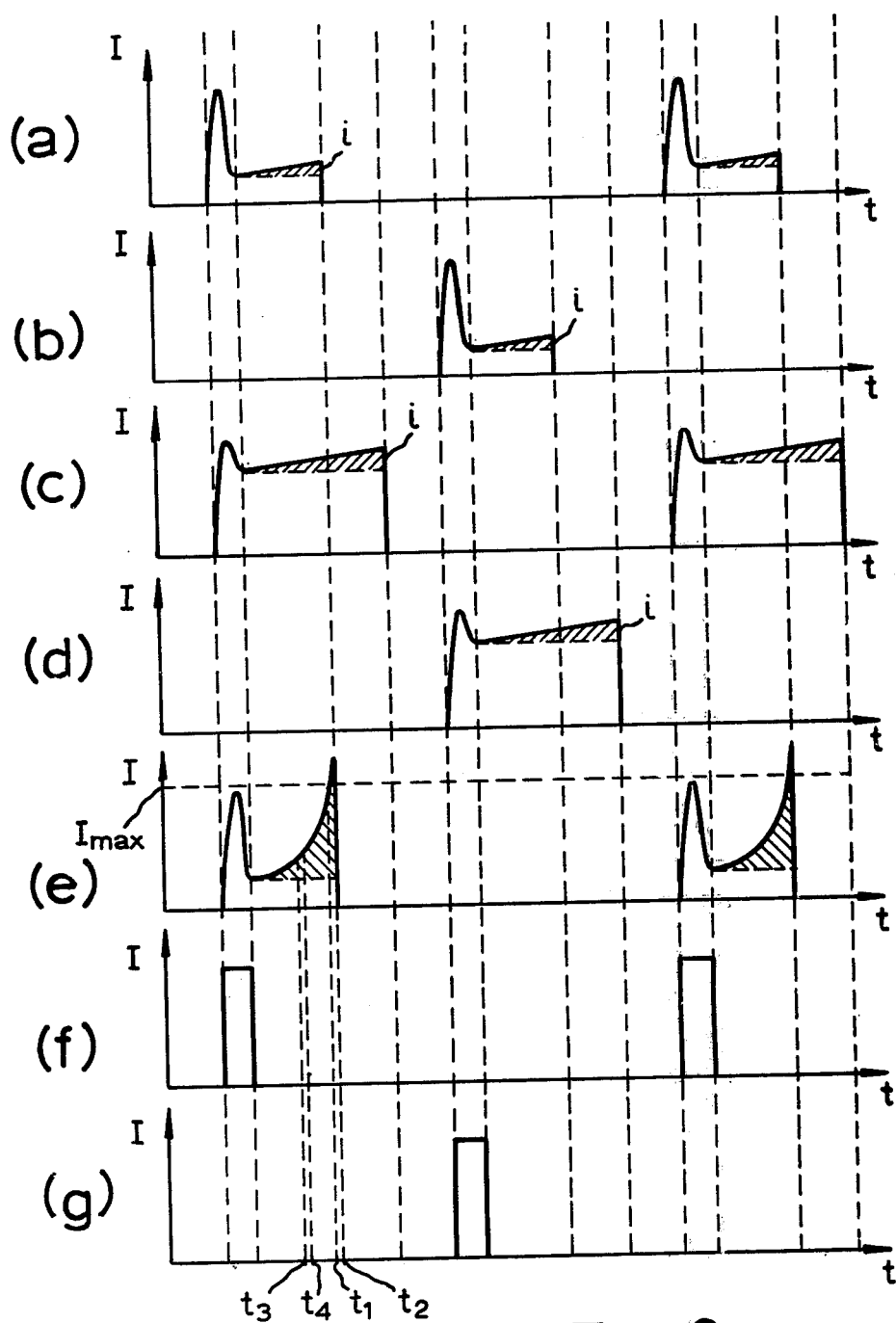
FIG. 2 shows some waveforms for explaining the operation of the converter of FIG. 1.

When a load 33 is connected across output terminals 8, 9, a dc input is applied to input terminals 31, 32 with the polarity indicated, and the circuit is energised, the switching transistors 1a and 1b are made to conduct alternately by push-pull switching signals appearing at the outputs 13a and 13b respectively of the switching signal source 2. When transistor 1a is conducting rectifier 10a is forward-biased and feeds current to the load. Similarly when transistor 1b is conducting rectifier 10b is forward biased and feeds current to the load. During normal operation the collector currents I of the switching transistors 1a and 1b may be as shown in a somewhat idealised manner in FIGS. 2a and 2b respectively for a low value of load current, and as shown in FIGS. 2c and 2d respectively for a higher value of load current. If the spike at the beginning of each conduction period (which is due to the discharge of capacitance at the collector of the corresponding transistor) is neglected it will be seen that the collector currents during each conduction period consist of a pedestal due to the reflected load current plus a component (shown shaded) which increases steadily. This latter component is the magnetization current of the (inductive) output transformer 6 (assuming that the magnetization current of the choke 11 is so small in comparison that it can be ignored).

If for some reason the transformer 6 is driven into its saturation region the waveforms shown in FIGS. 2a–2d will be modified. The shaded (magnetization) component which in FIGS. 2a–2d is shown as increasing linearly during each conduction period of the relevant transistor will instead increase during each conduction period at a rapidly increasing rate. An example of how the waveform of FIG. 2a may thus become transformed is shown in FIG. 2e, and the maximum value of current I then occurring might be sufficient to destroy the switching transistor through which it flows.

If a conventional switching transistor protection circuit were incorporated in the converter, which protection circuit operates to remove the drive to the switching transistors when the amplitude of the current carried thereby reaches a given value, this given value would, as mentioned previously, have to be pitched higher than the maximum value of I expected in normal operation, i.e. higher than the peak of the curve shown in FIG. 2c. Thus it may have to lie, for example, at the level denoted by $I_{max}$ in FIG. 2e. It will be seen that the transistor current I in FIG. 2e is increasing very rapidly when it reaches a value of $I_{max}$ and even if it only takes a very small time $t_1 \rightarrow t_2$ thereafter for the operation of the protection circuit to actually reduce the current in the transistor this time may be sufficient to allow I to increase to a value such that the transistor is destroyed.

A protection circuit of a different kind (comprising the items 17–30 in FIG. 1) is therefore provided instead of or in addition to the conventional protection circuit. This different protection circuit is sensitive to the increase which occurs in the currents I in the switching transistors during each conduction period after the initial rise (if any) in said currents at the start of the corresponding conduction periods. The protection circuit 17–30 acts to remove the drive to the switching transistors if the increase in the current carried by either switching transistor during that part of a conduction period which occurs after the turn-on spike reaches a given value, which value is chosen to be just greater than the increase which occurs in the corresponding periods under normal operating conditions, i.e. the current increase i in FIGS. 2a–2d. It will be seen from FIG. 2e that the protection circuit will in consequence operate at a time, for example that denoted by $t_3$ in FIG. 2, at which the current I carried by the relevant switching transistor is still increasing comparatively slowly so that even if the current in the transistor is not actually reduced until a further time $t_3 \rightarrow t_4$ has elapsed, where $(t_3 \rightarrow t_4) = (t_1 \rightarrow t_2)$, $I_{max}$ will not be exceeded.

In order to achieve this improved operation voltage waveforms corresponding to the collector currents in switching transistors 1a and 1b are fed to capacitors 21a and 21b respectively via the corresponding current-to-voltage converter 17, 18, 19, 20. These waveforms may therefore be similar to those shown in FIG. 2a or FIG. 2c and FIG. 2b or FIG. 2d respectively. Furthermore a pair of current waveforms as shown in FIGS. 2f and 2g are derived from the outputs 30a and 30b respectively of switching signal source 2 and are applied to the bases of transistors 29a and 29b respectively. The beginnings of the pulses of the waveform 2f coincide with the beginnings of the conduction times of transistor 1a and the beginnings of the pulses of waveform 2g coincide with the beginnings of the conduction times of transistor 1b. The duration of each pulse of the waveforms 2f and 2g is at least equal to the duration of the turn-on spike occurring at the beginning of each conduction period of a switching transistor. The waveforms 2f and 2g may, for example, be derived by means of monostable multivibrators from the switching pulses fed from the outputs 13 of source 2 to the driver transistors 3a and 3b respectively.

When, for example, a voltage waveform similar to a pulse of waveform 2a is applied to the right-hand electrode of capacitor 21a the left-hand electrode of capacitor 21a is held substantially at zero potential during the occurrence of the turn-on spike by the combined action of the components 25a, 26a, 27a, and 28a (which prevent it from going negative) and conduction in the transistor 29a (which prevents it from going positive), conduction in transistor 29a occurring because of the pulse of waveform 2f fed to its base. When the pulse of waveform 2f terminates the potential of the left-hand electrode of capacitor 21a rises positively because it is no longer being clamped at zero by transistor 29a and the potential on the right-hand electrode of the capacitor is rising due to the increasing magnetizing current in transformer 6. The values of the various circuit components are chosen so that, in normal operation, the resulting rise in the base potential of transistor 22a over the remainder of the conduction period in transistor 1a is just insufficient to cause conduction in the transistor 22a, i.e. is just less than the base-emitter threshold thereof. However, if instead a voltage waveform similar to FIG. 2e is fed to the right-hand electrode of capacitor 21a the increase in potential occurring at the base of transistor 22a during the conduction period of transistor 1a will rapidly become sufficient to turn transistor 22a on, the resulting voltage drop occurring at its collector being fed to the inhibit terminal 24a of source 2 to remove the drive from the switching transistors, for example by reducing one input of an AND gate included in the signal path to each output 13 from a logic "1" to a logic "0". The protection circuit comprising the items 17b–30 operates in a similar manner to protect transistor 1b.

If desired items 20b–29b may be omitted, items 20a–29a being made common to both protection circuits by connecting the cathodes of rectifiers 19a and 19b together and the outputs 30a and 30b of source 2 being combined into a single output which produces a waveform equal to the sum of the waveforms 2f and 2g.

It may be found in given cases that the turn-on spikes shown in FIGS. 2a–2e do not occur, or only occur with a negligible amplitude. In such cases the waveforms 2f and 2g may be modified, it then being sufficient to merely clamp the bases of the transistors 22a and 22b at ground potential at the start of each conduction period in the relevant switching transistor until the current in the relevant switching transistor has completed its initial rise.

If saturation should occur in the choke 11 the effect on the currents carried by the switching transistors will be similar to that produced by the transformer 6. Thus, if the choke is constructed so that it will be driven into saturation when the current taken by load 33 starts to exceed that which the switching transistors are capable of supplying, the protection circuit can be arranged to protect the switching transistors against this eventuality too. Otherwise the voltages appearing across resistors 20a and 20b are preferably also employed to operate a conventional current limit circuit, for example in the manner disclosed in the article by B. George entitled "Six volt 100 amp switched Mode Power Supply operating directly from the mains" in "Mullard Technical Communications" No. 123 (July 1974) page 113 and FIG. 13 on page 115. It may be desirable to provide such a conventional current limit circuit in addition in any case. They may also be used to operate a balancing circuit for the collector currents of the switching transistors, for example in the manner disclosed in United Kingdom Patent Specification No. 1,421,797.

The components of the protection circuits shown may have the following values or type numbers:-

| | |
|---|---|
| Transformers 17 | : Secondary inductance 20 mH, primary inductance 0.2 mH (assuming a switching frequency of approximately 25 kHz). |
| Resistors 18 | : 1K ohm |
| Diodes 19 | : BYX 55 |
| Resistors 20 | : 10 ohm |
| Capacitors 21 | : 2200 pF |
| Transistors 22 | : BSX 19 |
| Resistors 23 | : 18K ohm |
| Diodes 25, 26 | : BAW 62 |
| Resistors 27 | : 1K ohm |
| Capacitors 28 | : 0.22 µF |
| Transistors 29 | : BSX 19 |

A protection circuit of the type described may also be used in a single-ended converter of the "forward" type, i.e. the type in which current is supplied to a load during the conduction period of a switching transistor. The basic features of such a converter are discussed, for example, in an article entitled "A survey of converter circuits for switched mode power supplies" by L. E. Janssen in Mullard Technical Communications, Vol. 12, No. 119, (July 1973).

What we claim is:

1. A dc - dc converter comprising a switching transistor, a switching signal source having an output coupled to a control electrode of said transistor, an inductance connected in series combination with the main current path of said transistor across a DC supply source, means for coupling the inductance to a pair of output terminals via a rectifier with a polarity such that, when a load is present across said output terminals and the switching transistor is made to conduct, the rectifier will be forward biassed, a current change sensing circuit having an input coupled to the main current path of said switching transistor for sensing if the increase in the current in said main current path occurring during a given part of said transistor conduction period reaches a given value, which part does not include the start of the corresponding conduction period, and means coupling an output of said sensing circuit to the input of a current control circuit connected in circuit for controlling the switching transistor main current to prevent said current from exceeding the transistor rating if said given value is reached.

2. A converter as claimed in claim 1, wherein said current control circuit comprises an output inhibit circuit included in said switching signal source.

3. A converter as claimed in claim 1, wherein said current change sensing circuit comprises a current-to-voltage converter having an input connected in the main current path of the switching transistor and a voltage change sensing circuit having an input connected to the output of said current-to-voltage converter, said voltage change sensing circuit being constructed to sense if the increase in the output of said current-to-voltage converter occurring during said given part of the transistor conduction period reaches a given value.

4. A converter as claimed in claim 3, wherein said voltage change sensing circuit comprises a voltage threshold responsive device having an input coupled to the output of the current-to-voltage converter via a capacitor, and means for adjusting the potential on the threshold voltage responsive device side of said capacitor to a reference level at the start of each said conduction period.

5. A converter as claimed in claim 1, wherein each said given part of a conduction period is the whole of the corresponding conduction period subsequent to a starting portion thereof.

6. A converter circuit comprising, a controlled switching device, a source of DC supply voltage, a switching signal source having an output coupled to a control electrode of the switching device to alternately turn the switching device on and off, the switching device having a conduction period comprising a first part at the start thereof and a second subsequent part in which the current change through the switching device is limited to a given value during normal operation of the converter, an inductance means connected in series with the switching device across said DC supply source, means for coupling the inductance means to an output terminal via a rectifier device, a circuit for sensing a change in current independently of the amplitude of said current, means for coupling an input of the current change sensing circuit so as to sense the current through the switching device thereby to produce a control signal when it senses a current change during said second part of the conduction period exceeding said given value, and means coupling the control signal to a current control circuit connected so as to control the operation of the switching device to limit the current in the switching device to a safe value.

7. A converter as claimed in claim 6 wherein the current control circuit includes means for effectively inhibiting the transmission of drive signals from the switching signal source to the switching device.

8. A converter as claimed in claim 6 wherein said current change sensing circuit comprises a current-to-voltage converter having an input coupled to the main current path of the switching device and a voltage change sensing circuit having an input coupled to an output of the current-to-voltage converter and including means for determining whether a change in the output voltage of the current-to-voltage converter occurring during the second part of the conduction period exceeds said given value.

9. A converter as claimed in claim 6 wherein said current change sensing circuit comprises a current-to-voltage converter having an input coupled to the main current path of the switching device and a voltage threshold device coupled to the output of the current-to-voltage converter via a capacitor, and means for applying a reference voltage to the capacitor during said first part of the conduction period.

10. A converter as claimed in claim 6 wherein said current change sensing circuit comprises a current-to-voltage converter having an input coupled to the main current path of the switching device and a voltage threshold device coupled to the output of the current-to-voltage converter via a capacitor, and said switching signal source includes means for supplying an inhibit signal to the threshold device during said first part of each conduction period so as to prevent the current change sensing circuit from producing a control signal in the event of an initial current rise during said first part of a conduction period.

11. A converter as claimed in claim 6 further comprising a voltage sensor device coupled to the output terminal and responsive to the output voltage to supply a control voltage to a control input of the switching signal source to adjust the mark-to-space ratio of the output thereof in a sense to stabilize the output voltage at said output terminal.

12. A converter as claimed in claim 6 wherein said inductance means comprises an output transformer and wherein the approach of the transformer to a saturation condition causes said given value of current change to be exceeded, said converter further comprising means for inhibiting the operation of the current change sensing circuit during said first part of the switching device conduction period.

* * * * *